United States Patent [19]
Erickson

[11] Patent Number: 5,629,727
[45] Date of Patent: *May 13, 1997

[54] CONTINUOUS INK REFILL SYSTEM FOR DISPOSABLE INK JET CARTRIDGES HAVING A PREDETERMINED INK CAPACITY

[76] Inventor: Paul E. Erickson, 1112 Hidden Pond Trail, Prior Lake, Minn. 55372

[*] Notice: The term of this patent shall not extend beyond the expiration date of Pat. No. 5,369,429.

[21] Appl. No.: 604,401

[22] Filed: Feb. 21, 1996

Related U.S. Application Data

[63] Continuation of Ser. No. 345,510, Nov. 28, 1994, abandoned, which is a continuation of Ser. No. 139,576, Oct. 20, 1993, Pat. No. 5,369,429.

[51] Int. Cl.$^6$ ........................................... B41J 2/175
[52] U.S. Cl. ............................... 347/85; 347/7
[58] Field of Search ........................ 347/7, 85–87, 347/89; 355/260

[56] References Cited

U.S. PATENT DOCUMENTS

| | | |
|---|---|---|
| 4,342,041 | 7/1982 | Kasugayana et al. ............ 347/85 |
| 4,658,277 | 4/1987 | Toganoh et al. ................. 347/85 |
| 4,970,533 | 11/1990 | Saito et al. ...................... 347/86 |

*Primary Examiner*—N. Le

[57] ABSTRACT

A continuous ink refill system for an ink jet printer that uses disposable ink jet cartridges having a first predetermined ink capacity includes an ink reservoir that is external to a print carriage on which the disposable ink jet cartridges are mounted. The ink reservoir contains a second predetermined ink capacity that continuously refills an ink container within the disposable ink jet cartridge by a passive pressure differential between the disposable ink jet cartridge and the ink reservoir. The disposable ink jet cartridge is removably mountable in the print carriage and is a self-contained unit having a print head and an ink supply container maintained at a negative pressure that supplies the first quantity of ink to the print head. The ink reservoir storing the second quantity of ink that replenishes the ink supply container is limited to some multiple of the first quantity of ink above which said print head does not reliably operate. Tubing connects the ink supply container to the ink reservoir for transporting ink between the two by means of capillary action. A regulator switchable between an open and closed position is positioned in the piping for controlling flow of ink from the ink reservoir to the ink supply container when the regulator is in the open position.

23 Claims, 5 Drawing Sheets

CONTINUOUS INK REFILL SYSTEM FOR DISPOSABLE INK JET CARTRIDGES HAVING A PREDETERMINED INK CAPACITY

This is a Continuation of application Ser. No. 08/345,510, filed Nov. 28, 1994, abandoned, which in turn is a continuation of Ser. No. 08/139,576, filed Oct. 20, 1993, U.S. Pat. No. 5,369,429.

TECHNICAL FIELD

The present invention broadly relates to ink jet printers. More specifically, the present invention relates to a continuous ink refill system for disposable ink jet cartridges having a predetermined ink capacity.

BACKGROUND OF THE INVENTION

Ink jet printers and plotters are well known. The print quality of these printers is dependent on the consistent, successful functioning of the ink jet print heads which are susceptible to clogging and failure over time. To overcome the problems with deterioration of ink jet print heads over time, it is necessary to periodically replace the print heads. Early solutions to this problem replaced only the print head, as shown, for example, in U.S. Pat. No. 4,074,284. More recently, disposable ink jet cartridges have been developed to solve this problem, as described, for example, in U.S. Pat. Nos. 4,500,895, 4,921,811 and 4,931,812.

Disposable ink jet cartridges of this type are designed to operate for a useful life such that the head elements will function a very high percentage of the time (e.g., 99% of the time) during the life of the disposable cartridge. To ensure that this demanding performance figure is maintained, conventional disposable ink jet cartridges have a predetermined amount of ink contained within the cartridge that is available to be dispensed through the print head. The maximum amount of ink that is contained in the disposable cartridge is a function of how much printing the print head elements can do before failing to function at the very high performance percentage. Once the predetermined amount of ink in the cartridge is used, the entire ink jet cartridge is discarded.

While the use of disposable cartridge has effectively guaranteed the print quality of ink jet printers at the failure rate dictated by the particular disposable cartridge, there are many print applications which could tolerate a higher failure rate in exchange for an extended period of operation of the ink jet print head. Unfortunately, when existing disposable ink jet cartridges run out of ink, the print head is still functioning adequately in the vast majority of cases. Discarding ink jet cartridges that still have adequately functioning print heads wastes resources. In addition, frequent replacement of ink jet cartridges is time and labor intensive for large print applications. Consequently, many users have resorted to refilling ink jet cartridges in order to prolong the useful life of the print heads.

Manually refilling ink jet cartridges can be a messy and potentially hazardous operation that requires significant mechanical skill. To manually refill an ink jet cartridge, a user must access the original ink supply container in the ink jet cartridge and pump, pour or otherwise force ink into that supply container. Accessing any of ink couplings exposes the user to the ink and the ink to contamination. In addition, the user may inadvertently introduce air bubbles into the system which affects the flow of the ink and its ability to provide crisp, even print.

One method of refilling ink jet cartridges involves the use of a mechanical system of valves and pumps as described in U.S. Pat. No. 4,680,696. In addition to the complexity and expense of such a mechanical refill system, mechanical mechanisms are more likely to require additional maintenance and are more prone to failure than systems with few or no moving parts. Endless refill systems of this type are also susceptible to bacteria growth due to the presence of liquids in the system over long period of time that may clog or contaminate the printer.

An alternative method of refilling an ink jet printer uses gravity as controlled by a three way valve to feed ink from an ink reservoir to an ink supply container as part of a single replaceable unit, as described, for example, in U.S. Pat. No. 4,959,667. Early versions of this type of single replaceable unit ink delivery system as shown, for example, in U.S. Pat. Nos. 4,714,937 and 4,885,595. This method may be useful when the print heads are printing vertically and the ink reservoir can be positioned behind the print heads and above the ink supply container. When the print heads are printing on a large horizontal surface, however, the print head performance would be diminished if the weight and volume of a large reservoir of ink would need to be supported above the print heads as they operate.

While the use of disposable ink jet cartridges has significantly increased the print quality of ink jet printers, this increase in print quality has come at the expense of a significant waste of resources in the form of empty ink jet cartridges that still have long periods of useable life remaining for the print heads. Existing techniques to refill ink jet printers suffer from numerous drawbacks. Consequently, a disposable ink jet cartridge refill system that was easy to install, held significant volumes of ink, contained few moving parts, minimized ink contamination and unwanted air in the ink delivery system and conserved resources would be greatly appreciated.

SUMMARY OF THE INVENTION

The present invention is a continuous ink refill system for an ink jet printer that uses disposable ink jet cartridges having a first predetermined ink capacity. An ink reservoir that is external to a print carriage on which the disposable ink jet cartridges are mounted contains a second predetermined ink capacity that continuously refills an ink container within the disposable ink jet cartridge by a passive pressure differential between the ink container and the ink reservoir that draws ink as needed from the ink reservoir. The disposable ink jet cartridge is removably mountable in the print carriage and is a self-contained unit having a print head and an ink supply container maintained at a negative (i.e., sub-atmospheric) pressure that supplies the first quantity of ink to the print head. The ink reservoir storing the second quantity of ink that replenishes the ink supply container is limited to some multiple of the first quantity of ink above which said print head does not reliably operate. Tubing connects the ink supply container to the ink reservoir for transporting ink between the two by means of the pressure differential between the ink container and the ink reservoir. A regulator switchable between an open and closed position is positioned in the tubing for controlling flow of ink from the ink reservoir to the ink supply container when the regulator is in the open position.

In a preferred embodiment, the second quantity of ink stored in the ink reservoir is a predetermined volume based upon a selected viability of the print heads that is less than the very high performance viability established by the first quantity of ink in the ink container that is part of the ink jet cartridge. By selecting the capacity of the ink reservoir in accordance with these conditions, the useful life of the print heads can be extended up to 8 to 12 times (e.g., 400 cc) what would otherwise be the life of the disposable cartridge (e.g., 40 cc). In another embodiment, a user may select among several second quantities of ink (e.g., 200 cc to 600 cc) so as to effectively choose the level of viability value for a given printing application.

The ink reservoir of the preferred embodiment is a generally rectangular container having trapezoidal shaped sides with a large end that is lower and deeper than a small end. An ink bag is affixed within the container and tubing is inserted into the ink bag for drawing ink from the ink bag to the ink supply container in the disposable ink jet cartridge. The tubing is also affixed to the interior bottom of the ink bag near the large end. In this way, air will not get into the tubing when the ink bag is almost empty.

The disposable ink jet cartridge of the preferred embodiment is removably mountable in a print carriage of an ink jet printer that moves laterally with respect to a generally horizontal print receiving media. The disposable ink jet cartridge comprises a self-contained housing, including a print head having a plurality of ink jet and an ink supply container maintained at a negative pressure that supplies a first quantity of ink to the print head. The tubing extends through an aperture in a top surface of the housing for connecting to an ink reservoir system external to the print carriage that supplies a second quantity of ink to said ink supply container via the pressure differential between the ink container and the ink reservoir, the second quantity of ink being greater than the first quantity of ink.

During operation of the ink jet printer, the pressure differential between the ink container in the ink jet cartridge and the ink reservoir is maintained as the print heads expel a volumetric flow rate out of the print heads located near the bottom of the ink jet cartridge. It has been found that the action of the ink jet nozzles in the print heads is capable of drawing a fluid height of 2-3 inches without affecting image quality. In a first embodiment, the ink container in the ink jet cartridge is created as a sealed container and the pressure differential creates a vacuum that draws the ink from the ink reservoir to the ink container in the ink jet cartridge. In another embodiment, the ink container in the ink jet cartridge contains a foam element that creates the pressure differential between an upper vented portion and a lower portion proximate the print heads via the capillary action of the foam juxtaposed therebetween the two ink container portions.

DESCRIPTION OF THE PREFERRED EMBODIMENT

Figure 1:
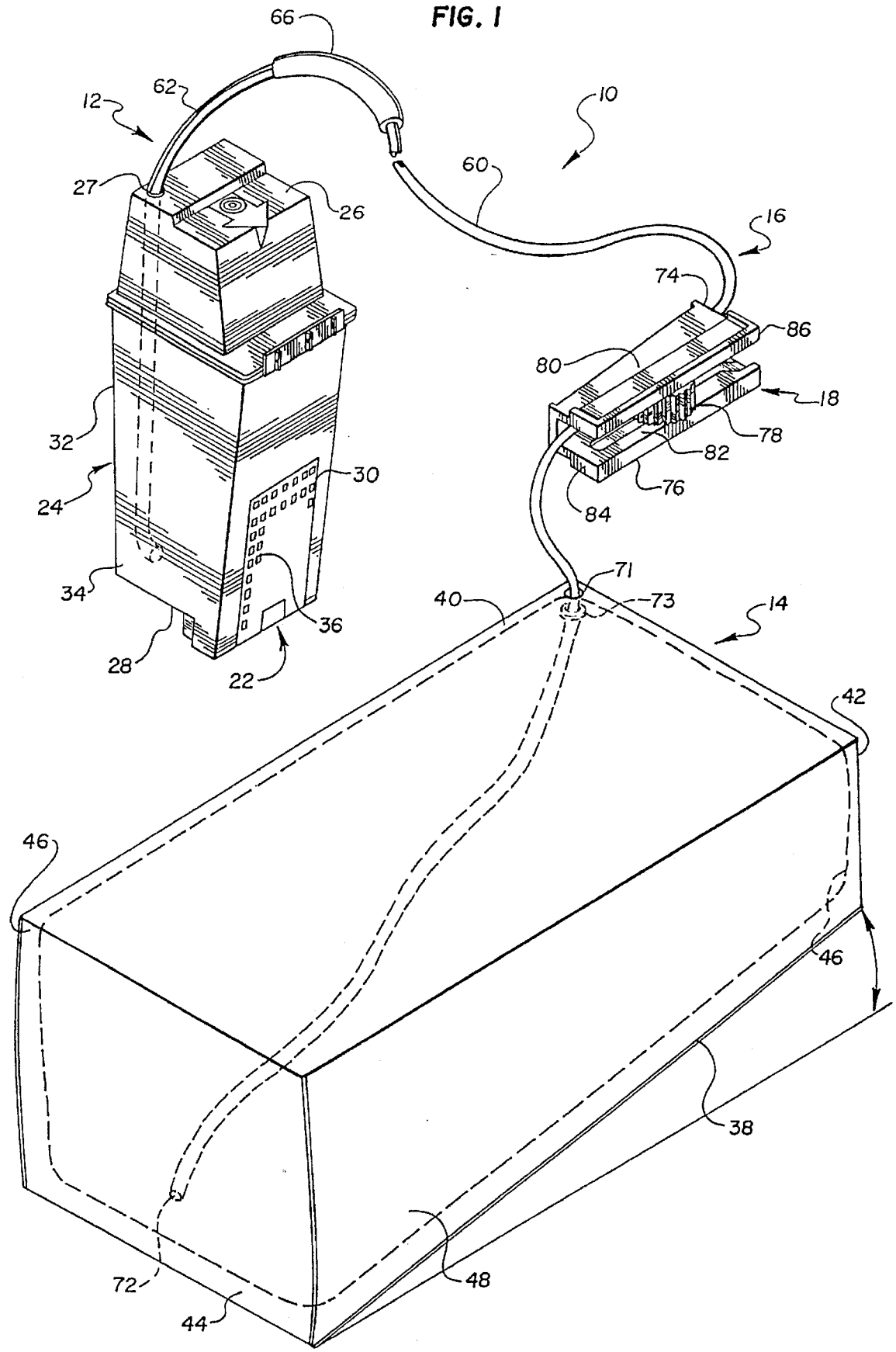
FIG. 1 depicts a perspective view of a continuous refill system for disposable ink jet cartridges in accordance with the present invention with various parts shown in phantom lines.

Reference is now made to the drawings, wherein like reference numerals denote like elements throughout the several views. Referring to FIG. 1, the preferred embodiment of a continuous ink refill system 10 for an ink jet printer broadly includes a disposable ink jet cartridge 12, an ink reservoir container 14, connecting piping system 16 and ink flow regulating component 18.

Disposable ink jet cartridge 12 broadly includes a print head 22 and an ink supply container 24 as part of a disposable self-contained unit that presents a cartridge top 26, base 28, front 30, rear 32 and opposed sides 34. As described in more detail in connection with the description of FIGS. 2 and 3, disposable ink jet cartridge 12 is loaded into an ink jet printer 90 by mounting disposable ink jet cartridge 12 in a print carriage 91 that move laterally with respect to a generally horizontally-oriented print media. Print head 22 includes a plurality of head elements 36 that are electrically connected to a control unit (not shown) within ink jet printer 90. Ink supply container 24 is operably coupled to print head 22. Methods of coupling ink supply container 24 to print head 22 are well known in the art as shown, for example, in U.S. Pat. Nos. 4,500,895, 4,921,811 and 4,931,812. In the preferred embodiment, ink supply container 24 can hold at least 40 cc of ink. In the preferred embodiment, disposable ink jet cartridge 12 is a HP High Capacity print cartridge available from Hewlett-Packard Company, or an equivalent disposable ink jet cartridge, including ink jet cartridges with foam inserts.

Referring now to FIGS. 5 and 6a–6e, ink reservoir container 14 is a generally rectangular box presenting a reservoir base 38, reservoir top 40, reservoir small end 42, reservoir large end 44, and opposed reservoir sides 46. The reservoir sides are trapezoidal in shape as reservoir base 38 angles upward from reservoir large end 44 to reservoir small end 42. In the preferred embodiment, reservoir base 38 angles upward at a 5 to 15 degree angle relative to a horizontal plane and ink reservoir container 14 carries a characteristic length of 5–7", a characteristic width of 2–4", a small end with a characteristic height of 0.5–2.5", a large end with a characteristic height of 1.5–3.5". Ink reservoir container 14 provides structure defining space of a sufficient volume to hold an ink bag 48. It will be understood that the dimensions of ink reservoir container 14 may change depending on the size of ink bag 48. In the preferred embodiment, ink reservoir container 14 is constructed of rigid heavyweight cardboard glued firmly into the desired shape.

Ink bag 48 is a flexible, pleated envelope adhesively mounted to an interior bottom surface of reservoir base 38 adjacent to large end 44. In the preferred embodiment, ink bag 48 is constructed of a resilient flexible polymer with a metallic foil appearance. Ink bag 48 is of sufficient size to hold a predetermined volume of ink that is several times larger than the volume of ink contained in ink supply container 24. In the preferred embodiment, the predetermined volumes of ink are values which are multiples of the volume of ink stored in ink supply container 24 up to about 400 to 600 cc of ink for a 40 cc volume of ink contained in ink supply container 24. It will be understood that ink bag 48 is used primarily to prevent any spillage of ink during handling of system 10 by a user and that ink bag 48 is not required to effect the creation of the necessary pressure differential for operation of the system.

Figure 4:
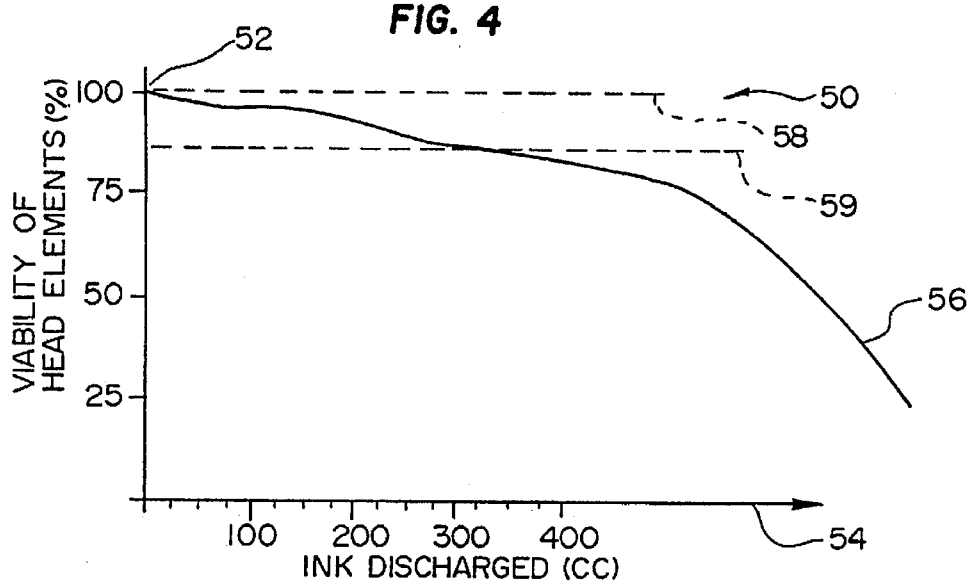
FIG. 4 is a graphical representation of the extended useful life of a disposable ink jet cartridge in accordance with the present invention in comparison to the useful life of a disposable ink jet cartridge without the continuous refill system of the present invention.
Figure 5:
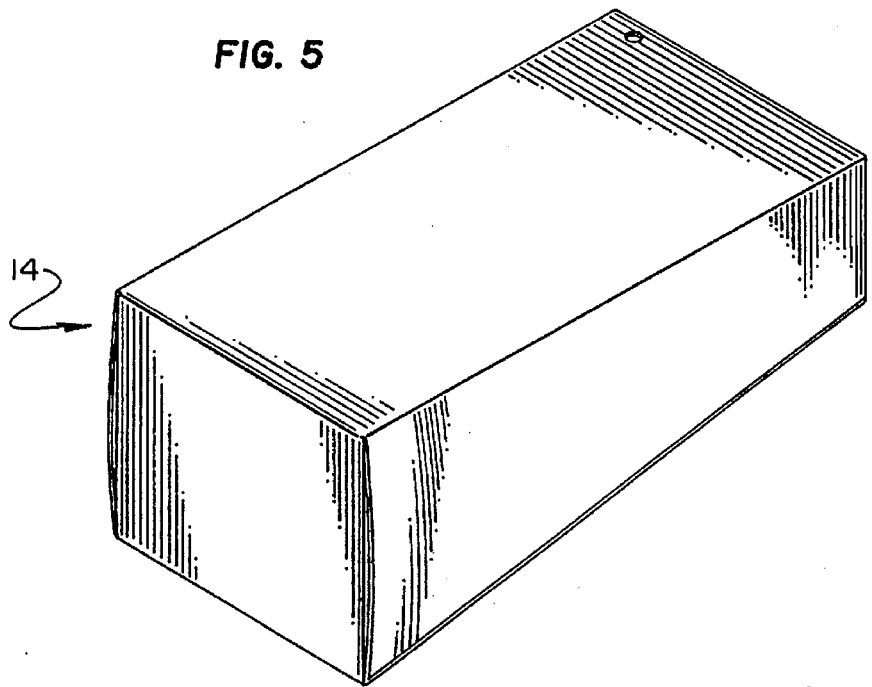
FIG. 5 is a perspective view of a reservoir container that is part of the continuous refill system of the present invention.
Figure 6A:
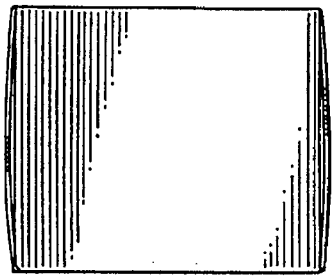
FIG. 6a is a first end view of the reservoir container of FIG. 5.
Figure 6B:
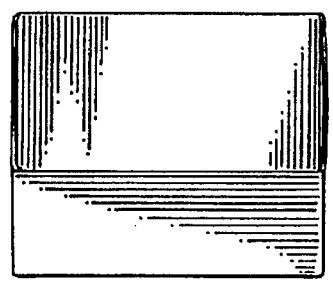
FIG. 6b is a second end view of the reservoir container of FIG. 5.
Figure 6C:
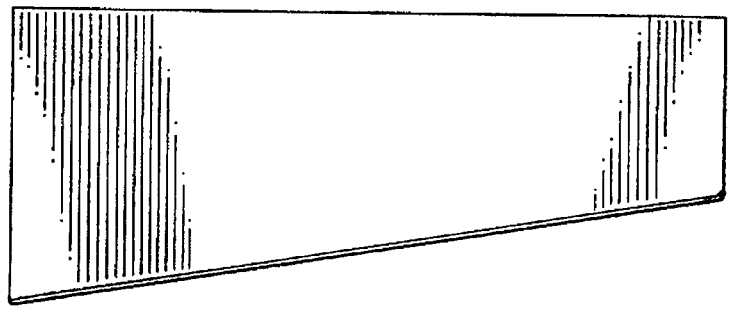
FIG. 6c is a side view of the reservoir container of FIG. 5.
Figure 6D:
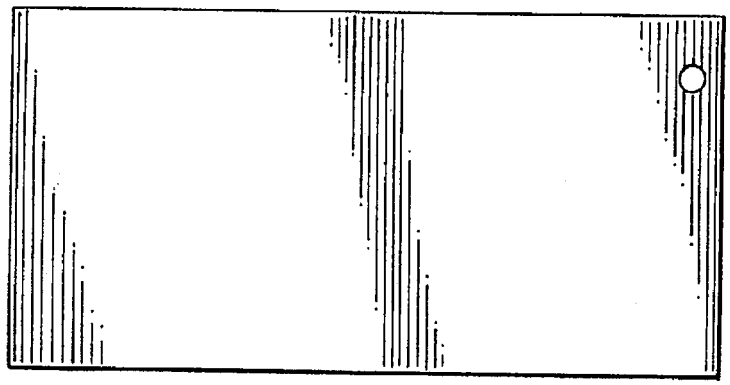
FIG. 6d is a top view of the reservoir container of FIG. 5.
Figure 6E:
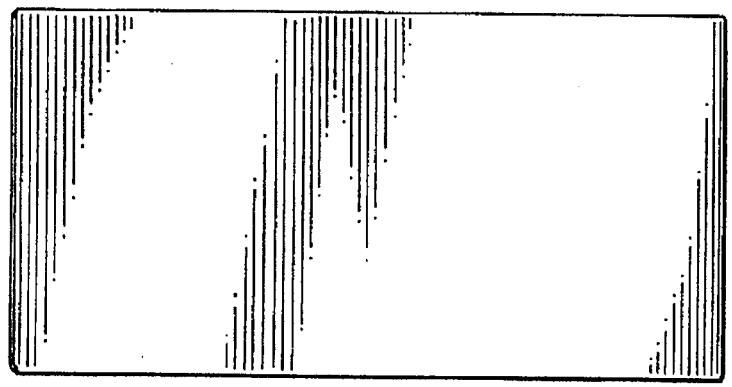
FIG. 6e is a bottom view of the reservoir container of FIG. 5.

Predetermined volumes of ink to store in ink bag 48 can be calculated with reference to graph 50 of FIG. 4. Graph 50 shows the change in the effective viability of the head elements 36 (y axis 52) relative to the volume of ink discharged through the print head 22 (x axis 54) as shown by the curve 56. The upper dashed line 58 indicates a 99% effective viability of the head elements 36 meaning that 99% of the head elements 36 will not fail during the delivery life of a disposable ink jet cartridge having a first quantity of ink in ink supply container 24, for example, 40 cc. The lower dashed line 59 indicates about an 85% effective viability of head elements 36. The curve 56 plots the demonstrated effective viability of head elements 36 relative to the volume of ink discharged through print head 22. In other words, curve 56 shows the percentage of head elements 36 that will not fail once a given volume of ink has been discharged through head elements 36. More specifically, curve 56 shows that head elements 36 retain at least about a 85% effective viability up to at least ten times the ink volume in ink supply container 24, or, in other words, eight refills of the ink supply container 24. Thus, for print applications that do not require a 99% or greater effective viability of head elements 36, the useful life of the ink jet cartridge 12 can be extended beyond that provided by the volume of ink in ink supply container 24 by replenishing ink supply container 24 with ink from ink reservoir container 14. It will be understood that curve 56 is representative of the viability of a particular ink jet cartridge and print head, and that for different types cartridges and print heads there may be different curves 56. It has been found that a range of about plus or minus 10% about the 85% viability shown at 59 covers the effective viability ranges which can be utilized with the present invention and current ink jet print head technology without significantly impacting overall printer performance. It can further be seen, that for the particular heads shown in FIG. 4, the advantage of further refills dramatically decreases below about the 75% level as head failure begins to occur more frequently after this point.

Referring again to FIG. 1, connecting piping system 16 includes one or more pieces of very flexible tubing 60 extending from ink supply container 24 to ink reservoir container 14. In a preferred embodiment, flexible tubing 60 is inserted through an aperture 27 in cartridge top 26 and is extended to a point where a distal end of flexible tubing 60 is located approximately at the bottom of cartridge 24. Flexible tubing 60 is glued to aperture 27, thereby sealing cartridge 24 and providing strain relief for flexible tubing 60.

In addition, connecting piping system 16 preferably includes a formable yet rigid tube 62, flexible tubing 60 and seal 66. Rigid tube 62 is inserted into ink supply container 24 through cartridge top 26 adjacent to cartridge rear 32 and one of the opposed cartridge sides 34 and extends downwardly into ink supply container 14. Rigid tube 62 is joined to cartridge top 26 in an airtight seal and includes appropriate strain relief. Rigid tube 62 includes an upper portion extending upwardly and generally horizontally above cartridge top 26. In this embodiment, tubing 60 is operably joined to upper portion of rigid tubing 62 by seal 66. In this embodiment, seal 66 is a hollow cylinder of a slightly larger diameter than tube 62 and tubing 60 that encloses and the overlaps upper end of tube 62 of tubing 60 to form a permanent airtight seal.

Flexible tubing 60 presents a reservoir end 72. In the preferred embodiment, tubing 60 presents an outside diameter of about 0.125 inches and an inside diameter compatible with 1/16 inch tube fittings. Reservoir end 72 extends into the ink bag 48 through aperture 71 and is attached to the ink bag 48 along a bottom interior surface near reservoir large end 44. As with ink supply container 24, reservoir end 72 in ink reservoir container 14 is provided with appropriate strain relief. In a preferred embodiment, the strain relief is provided by affixing a portion or reservoir end 72 around the circumference of a small disc 73 having a diameter greater than aperture 71 that is located inside of ink reservoir 14, but outside of ink bag 48, on small end 42 near aperture 71, for example.

In the preferred embodiment, ink flow regulating component 18 is a stopcock 74. As those skilled in the art will understand, stopcock 74 may be of any type that is switchable between an open and closed position such that ink may flow through piping system 16 when stopcock 74 is in the open position and ink will not flow through piping system 16 when stopcock 74 is in the closed position, such as a conventional quarter-turn ball valve stopcock. In the embodiment shown in FIG. 1, stopcock 74 includes structure defining a tubing channel 76 and a pressure wheel 78. Tubing channel 76 includes a sloped channel floor 80 and opposed side walls 82. Channel floor 80 angles upward from a first end 84 of channel 76 to opposed second end 86. Channel 76 is of sufficient width and depth at the first end 84 to support the tubing 60 and at least half of pressure wheel 78. At second end 86, the depth of channel 76 is less than that at first end 84 and is sufficient to support pressure wheel 78 such that pressure wheel 78 pinches tubing 60 against channel floor 80 to prevent the ink from flowing through tubing 60. One advantage of stopcock 74 over some other types of stopcocks is that stopcock 74 does not require that tubing 60 be cut in order to accommodate the stopcock.

Figure 7:
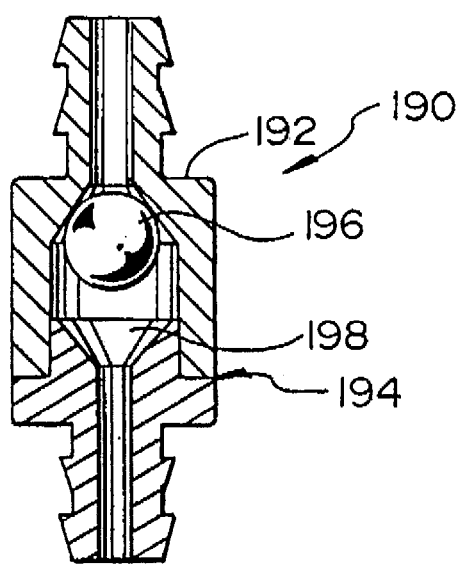
FIG. 7 is a cross-sectional side view of a check value for use with the present invention.

Referring to FIG. 7, an optional check valve 190 for use with ink reservoir container 14 is shown. Check valve 190 is adapted for insertion into 0.125 inch outer diameter tubing and is formed from a top half 192 and bottom half 194, between which ball 96 is allowed to float within interior chamber 198. In this embodiment, ball 96 is 0.125 inches in diameter and is made of polypropylene so that the pressure required to activate check valve 190 is very slight. In normal operation, ball 96 will float to the seat in top half 192 and will be pushed down by a flow of ink in response to a pressure change created by operation of the print heads, for example. In the event that ink reservoir container becomes empty or an air bubble is introduced into piping 16, ball 96 will sink to the seat in bottom half 194 and will prevent the introduction of air into ink jet cartridge 12. Check valve 190 may be positioned either internal to ink reservoir container 14, or external to ink reservoir container 14, but prior to stopcock 74. In an alternate embodiment, the seat in bottom half 194 is not sealing and no forward flow of ink is prohibited by the check valve. In this embodiment, ink bag 48 must itself be sealed to prevent loss of vacuum inside cartridge 12.

In operation, continuous ink refill system 10 is primed by setting ink flow regulating component 18 in an open position and filling ink bag 48 from an external source. Next, all air is purged from piping system 16. Then, disposable ink jet cartridge 12 is lifted vertically to a level at least about two to three inches above the level of the ink in ink bag 48 to allow enough negative (i.e., sub-atmospheric) pressure to develop inside the disposable ink jet cartridge as to prevent leakage of ink. The flow regulating component 18 is then set in closed position. Priming continuous ink refill system 10 minimizes the presence of unwanted air in continuous ink refill system 10 and seals it against contamination. A user receives continuous ink refill system 10 ready to be installed in ink jet printer 90.

Figure 2:
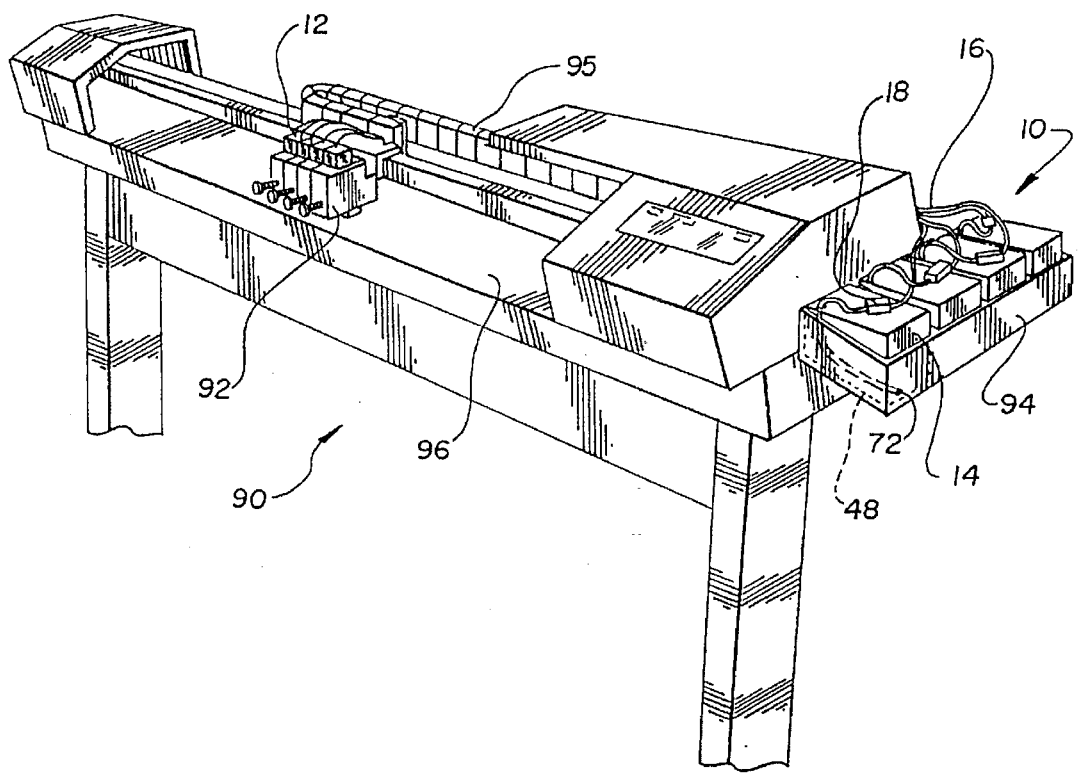
FIG. 2 is a perspective view of the refill system in accordance with the present invention installed in an ink jet printer.
Figure 3:
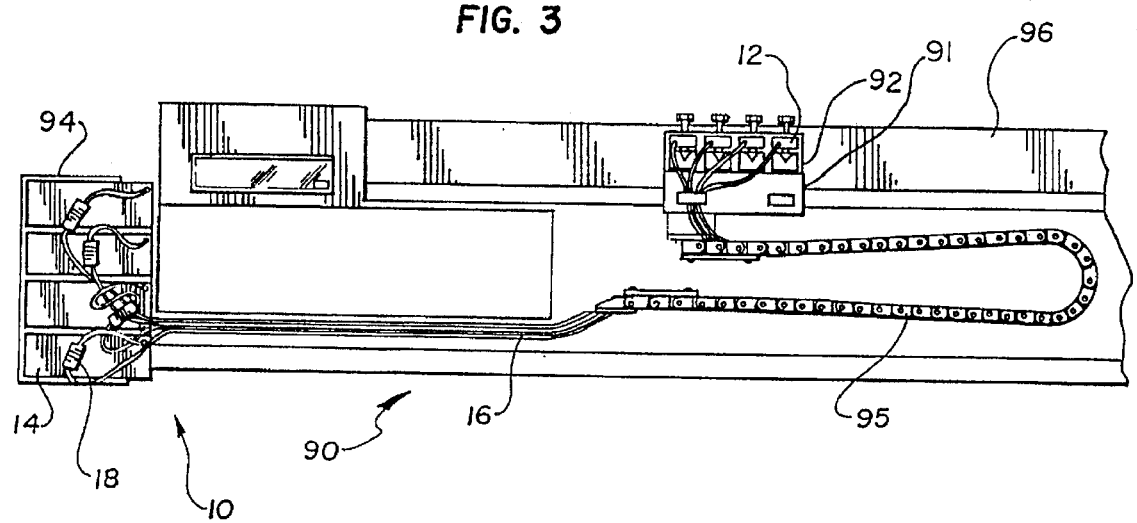
FIG. 3 is a top view of the refill system installed in an ink jet printer.

Referring to FIGS. 2 and 3, ink jet printer 90 includes a print carriage 91 with a plurality of cartridge holders 92, a reservoir support 94, ink line housing 95 and print pattern 96. A disposable ink jet cartridge 12 is installed in a cartridge holder 92 and aligned with other like disposable ink jet cartridges 12 such that each print head 22 is positioned above and adjacent to print platen 96 and is aligned with every other print head 22. Ink reservoir container 14 for the disposable ink jet cartridge 12 is placed in a corresponding partition in reservoir support 94. Piping system 16 extends between ink supply container 24 of disposable ink jet cartridge 12 and ink reservoir container 14 through ink line housing 95. Print platen 96 supports paper or other print media (not shown) on which a predetermined pattern is to be printed under control of a control unit (also not shown).

In one embodiment, reservoir support 94 is positioned such that the bottom of ink reservoir container 14 is about 2 to 3 inches below the bottom of ink supply container 24 in disposable ink jet cartridge 12. This effectively maintains the same passive pressure as the system 10 had when originally charged. In an alternate embodiment where a capillary of a foam element action is used to create the pressure differential between an upper open vented portion of the ink supply container 24 proximate the ink reservoir container 14 and a lower portion proximate the print heads 22 of the ink supply container 24, reservoir support would be positioned such that the bottom of ink reservoir container 14 is essentially level with the bottom of ink supply container 24 in disposable ink jet cartridge 12. This is done because the pressure differential of the capillary action cannot draw ink through any significant pressure differential created by a siphoning action between the ink reservoir container 14 and the ink supply container 24. In both embodiments, however, a passive pressure differential is used to convey the ink from ink reservoir container 14 in a unitary system to ink supply container 24 without any mechanical assistance in the form of pumps, etc.

To initiate the flow of ink from ink reservoir container 14 through piping system 16 to ink supply container 24, a user sets ink flow regulating component 18 in an open position. Ink flows from ink reservoir container 14 to ink supply container 24 through the pressure differential between ink container 24 and ink reservoir 14, moving into the vacuum created in the piping system 16 during the priming process. In the preferred embodiment, the ink exits continuous ink refill system 10 through print head elements 36 when they are energized in a manner well known in the art. The self-contained, liquid-tight, sealed structure of ink jet refill system 10 maintains the continuous replenishment of ink as long as ink flow regulating component 18 is in the open position. Angled reservoir base 38 of ink reservoir container 14 relies on gravity to maintain ink in contact with reservoir end 72 of tubing 60 as ink bag 48 empties.

The absence of moving mechanical components, such as a pump or mechanical valves, make the continuous ink jet refill system of the present invention less prone to mechanical failure. The self-contained structure of present invention makes continuous ink jet refill system 10 easy to use and install and minimizes the possibility of ink spills or contamination. Continuous ink jet refill system 10 provides a consistent and reliable ink flow to print head 22 such that the useful life of conventional disposable ink jet print cartridges 12 is extended beyond its original designed expiration.

Numerous characteristics and advantages of the invention have been set forth in the foregoing description. It will be understood, of course, that this disclosure is, in many respects, only illustrative. Changes can be made in details, particularly in matters of shape, size and arrangement of parts without exceeding the scope of the invention.

I claim:

1. A continuous ink refill system for an ink jet printer having a print carriage that moves laterally with respect to a print-receiving medium, the refill system comprising:
   (a) a disposable ink jet cartridge removably mountable in the print carriage, the disposable ink jet cartridge housing, in a self-contained unit:
      (1) an internal ink supply container defining a first volume of liquid ink of at least about 40 cubic centimeters, the internal ink supply container being maintained at a sub-atmospheric pressure and being free of a foam insert; and
      (2) a print head coupled directly with the internal ink supply container to receive liquid ink from the internal ink supply container for discharge to the print-receiving medium during a printing operation;
      the print head having a known pattern of reliability expressed as a function of the amount of liquid ink discharged through the print head during the printing operation;
      the first volume of liquid ink of the internal ink supply container defining an amount of liquid ink that, when discharged through the print head, corresponds to a pattern of reliability above a first predetermined minimum value corresponding to a viability of the print head of about 99%;
   (b) an external ink reservoir container, external to the disposable ink jet cartridge, defining a second volume of liquid ink separate from the first volume of liquid ink to supply liquid ink to the internal ink supply container of the disposable ink jet cartridge, the second volume of liquid ink being at least about 160 cubic centimeters, the second volume of liquid ink being greater than the first volume of liquid ink;
      the sum of the first volume of liquid ink and the second volume of liquid ink defining an extended volume of liquid ink;
      the extended volume of liquid ink defining an amount of liquid ink dischargeable through the print head without the corresponding pattern of reliability falling below a second predetermined minimum value corresponding to a viability of the print head of about 75%, the second predetermined minimum value being lower than the first predetermined minimum value; and
   (c) flexible tubing operably coupled to the internal ink supply container and to the external ink reservoir container to draw liquid ink from the external ink reservoir container to the internal ink supply container due to the sub-atmospheric pressure maintained within the internal ink supply container, freely of moving mechanical ink-transfer components and freely of capillary action, as liquid ink is discharged by the print head from the internal ink supply container;

(d) wherein:
(1) the external ink reservoir container and the flexible tubing are sealed together, replacement of the external ink reservoir container consequently causing replacement of at least a portion of the flexible tubing;
(2) the disposable ink jet cartridge and the flexible tubing are sealed together, replacement of the disposable ink jet cartridge consequently causing replacement of at least a portion of the flexible tubing; and
(3) the operating time during which the reliability pattern of the print head remains above the second predetermined minimum value during use of the ink jet printer corresponds to the operating time needed to exhaust the first and second volumes of liquid ink in the internal ink supply container and the external ink reservoir container.

2. The refill system of claim 1, further comprising a regulator switchable between an open position and a closed position and operably coupled to the flexible tubing, the regulator controlling flow of liquid ink from the external ink reservoir container to the internal ink supply container as needed to continuously replenish the first volume of liquid ink stored in the internal ink supply container when the regulator is in the open position.

3. The refill system of claim 2, wherein the regulator comprises an in-line stopcock with a pressure wheel constructed to pinch the tubing closed when the regulator is in the closed position.

4. The refill system of claim 1, wherein the external ink reservoir container comprises:
(a) a container trapezoidal in shape and presenting a small end a large end, and a base inclined upward from the large end to the small end; and
(b) a sealed ink bag within the container, at least a portion of the ink bag being attached to an interior bottom surface of the container adjacent to the large end, the tubing extending into the ink bag and attaching to an interior bottom surface of the ink bag.

5. The refill system of claim 1, wherein the internal ink supply container draws a fluid height of greater than about 2 inches and less than about 4 inches when a bottom level of the external ink reservoir is maintained at a vertical position below a bottom level of the internal ink supply container.

6. The refill system of claim 1, wherein the print head is mounted on structure defining the internal ink supply container.

7. The continuous ink refill system of claim 1, wherein the flexible tubing comprises more than one piece of flexible tubing.

8. The continuous ink refill system of claim 1, wherein the flexible tubing comprises only one piece of flexible tubing.

9. An ink jet printer for transferring ink to a print-receiving medium, the ink jet printer comprising:
(a) a print carriage constructed to move laterally with respect to the print-receiving medium, the print carriage comprising a plurality of cartridge holders;
(b) a fixed reservoir support; and
(c) a continuous ink refill system, the refill system comprising:
(1) a plurality of disposable ink jet cartridges, each removably mountable in a respective cartridge holder of the print carriage, each disposable ink jet cartridge housing, in a self-contained unit:
(aa) an internal ink supply container defining a first volume of liquid ink of at least about 40 cubic centimeters, the internal ink supply container being maintained at a sub-atmospheric pressure and being free of a foam insert; and
(bb) a print head coupled directly with the internal ink supply container to receive liquid ink from the internal ink supply container for discharge to the print-receiving medium during a printing operation;
the print head having a known pattern of reliability expressed as a function of the amount of liquid ink discharged through the print head during the printing operation; the first volume of liquid ink of the internal ink supply container defining an amount of liquid ink that, when discharged through the print head, corresponds to a pattern of reliability above a first predetermined minimum value corresponding to a viability of the print head of about 99%;
(2) a plurality of external ink reservoir containers external to the plurality of disposable ink jet cartridges, each external ink reservoir container:
(aa) being supported by the fixed reservoir support;
(bb) being connected to a corresponding disposable ink jet cartridge;
(cc) defining a second volume of liquid ink separate from the first volume of liquid ink of its corresponding disposable ink jet cartridge, the second volume of liquid ink being at least 160 cubic centimeters and being greater than the first volume of liquid ink; and
(dd) being operably coupled to and supplying liquid ink to the internal ink supply container of its corresponding disposable ink jet cartridge;
the sum of each first volume of liquid ink and each second volume of liquid ink defining a respective extended volume of liquid ink;
the extended volume of liquid ink defining an amount of liquid ink dischargeable through a respective print head without the corresponding pattern of reliability falling below a second predetermined minimum value corresponding to a viability of the print head of about 75%, the second predetermined minimum value being lower than the first predetermined minimum value;
(3) a plurality of flexible supply pipes, each flexible supply pipe being operably coupled to a respective internal ink supply container and to its corresponding external ink reservoir container to draw liquid ink from each external ink reservoir container to its corresponding internal ink supply container due to the sub-atmospheric pressure maintained within each internal ink supply container, freely of moving mechanical ink-transfer components and freely of capillary action, as liquid ink is discharged by each respective print head from each respective internal ink supply container; and
(4) a flexible housing extending at least part-way between the print carriage and the fixed reservoir support, the flexible housing containing the plurality of flexible supply pipes;
(5) wherein:
(aa) each external ink reservoir container and its corresponding flexible supply pipe are sealed together, replacement of each external ink reservoir container consequently causing replacement of at least a portion of its corresponding flexible supply pipe;

(bb) each disposable ink jet cartridge and its corresponding flexible supply pipe are sealed together, replacement of each disposable ink jet cartridge consequently causing replacement of at least a portion of its corresponding flexible supply pipe; and (cc) the operating time during which the reliability pattern of a respective print head remains above the second predetermined minimum value during use of the ink jet printer corresponds to the operating time needed to exhaust the first and second volumes of liquid ink in the respective internal ink supply container and the respective external ink reservoir container.

10. The ink jet printer of claim 9, wherein:

(a) each external ink reservoir comprises a container trapezoidal in shape and presenting a small end a large end, and a base inclined upward from the large end to the small end; and (b) the fixed reservoir support comprises a plurality of partitioned sections, each section having an upwardly inclined bottom portion corresponding to and supporting the upwardly inclined base of each external ink reservoir.

11. The ink jet printer of claim 9, further comprising a plurality of regulators, each regulator being switchable between an open position and a closed position and operably coupled to a corresponding flexible supply pipe, each regulator controlling flow of liquid ink from its corresponding external ink reservoir container to its corresponding internal ink supply container as needed to continuously replenish the first volume of liquid ink stored in the respective internal ink supply container when the respective regulator is in the open position, the regulator comprising an in-line stopcock with a pressure wheel constructed to pinch the tubing closed when the stopcock is in a closed position.

12. The ink jet printer of claim 9, wherein each of the plurality of flexible supply pipes comprises more than one piece of flexible tubing.

13. The ink jet printer of claim 9, wherein each of the plurality of flexible supply pipes comprises only one piece of flexible tubing.

14. A continuous ink refill system for an ink jet printer having a print carriage that moves laterally with respect to a print-receiving medium, the refill system comprising:

(a) disposable ink jet cartridge means, removably mountable in the print carriage, for supplying and discharging ink to the print-receiving medium, the disposable ink jet cartridge means housing, in a self-contained unit:

(1) internal ink supply container means for defining a first volume of liquid ink of at least about 40 cubic centimeters, the internal ink supply container means being maintained at a sub-atmospheric pressure and being free of a foam insert; and (2) print head means, coupled directly with the internal ink supply container, for receiving liquid ink from the internal ink supply container means and for discharging liquid ink to the print-receiving medium during a printing operation;

the print head means having a known pattern of reliability expressed as a function of the amount of liquid ink discharged through the print head means during the printing operation;

the first volume of liquid, ink of the internal ink supply container means defining an amount of liquid ink that, when discharged through the print head means, corresponds to a pattern of reliability above a first predetermined minimum value corresponding to a viability of the print head of about 99%;

(b) external ink reservoir container means, external to the disposable ink jet cartridge means, for defining a second volume of liquid ink separate from the first volume of liquid ink to supply liquid ink to the internal ink supply container means of the disposable ink jet cartridge means, the second volume of liquid ink being at least about 160 cubic centimeters, the second volume of liquid ink being greater than the first volume of liquid ink;

the sum of the first volume of liquid ink and the second volume of liquid ink defining an extended volume of liquid ink;

the extended volume of liquid ink defining an amount of liquid ink dischargeable through the print head means without the corresponding pattern of reliability falling below a second predetermined minimum value corresponding to a viability of the print head of about 75%, the second predetermined minimum value being lower than the first predetermined minimum value; and (c) flexible tubing means, operably coupled to the internal ink supply container means and to the external ink reservoir container means, for drawing liquid ink from the external ink reservoir container means to the internal ink supply container means due to the sub-atmospheric pressure maintained within the internal ink supply container means, freely of moving mechanical ink-transfer components and freely of capillary action, as liquid ink is discharged by the print head means from the internal ink supply container means;

(d) wherein:

(1) the external ink reservoir container means and the flexible tubing means are sealed together, replacement of the external ink reservoir container means consequently causing replacement of at least a portion of the flexible tubing means;

(2) the disposable ink jet cartridge means and the flexible tubing means are sealed together, replacement of the disposable ink jet cartridge means consequently causing replacement of at least a portion of the flexible tubing means; and (3) the operating time during which the reliability pattern of the print head means remains above the second predetermined minimum value during use of the ink jet printer corresponds to the operating time needed to exhaust the first and second volumes of liquid in the internal ink supply container means and the external ink reservoir container means.

15. The refill system of claim 14, further comprising regulator means, switchable between an open position and a closed position and operably coupled to the flexible tubing means, for controlling flow of liquid ink from the external ink reservoir container means to the internal ink supply container means as needed to continuously replenish the first volume of liquid ink stored in the internal ink supply container means when the regulator means is in the open position.

16. The refill system of claim, 14, wherein the regulator means comprises in-line stopcock means and pressure wheel means for pinching the tubing means closed when the regulator means is in the closed position.

17. The continuous ink refill system of claim 14, wherein the flexible tubing means comprises more than one piece of flexible tubing.

18. The continuous ink refill system of claim 14, wherein the flexible tubing means comprises only one piece of flexible tubing.

19. A continuous ink refill system for an ink jet printer having a print carriage that moves laterally with respect to a print-receiving medium, the refill system comprising:
(a) a disposable ink jet cartridge removably mountable in the print carriage, the disposable ink jet cartridge housing, in a self-contained unit:
  (1) an internal ink supply container defining a first volume of liquid ink of at least about 40 cubic centimeters, the internal ink supply container being maintained at a sub-atmospheric pressure and being free of a foam insert; and (2) a print head coupled directly with the internal ink supply container to receive liquid ink from the internal ink supply container for discharge to the print-receiving medium during a printing operation;
  the print head having a known pattern of reliability expressed as a function of the amount of liquid ink discharged through the print head during the printing operation;
  the first volume of liquid ink of the internal ink supply container defining an amount of liquid ink that, when discharged through the print head, corresponds to a pattern of reliability above a first predetermined minimum value corresponding to a viability of the print head of about 99%;
(b) an external ink reservoir container, external to the disposable ink jet cartridge, defining a second volume of liquid ink separate from the first volume of liquid ink to supply liquid ink to the internal ink supply container of the disposable ink jet cartridge, the second volume of liquid ink being at least about 160 cubic centimeters, the second volume of liquid ink being greater than the first volume of liquid ink; the sum of the first volume of liquid ink and the second volume of liquid ink defining an extended volume of liquid ink;
  the extended volume of liquid ink defining an amount of liquid ink dischargeable through the print head without the corresponding pattern of reliability falling below a second predetermined minimum value corresponding to a viability of the print head of about 75%, the second predetermined minimum value being lower than the first predetermined minimum value;
  the external ink reservoir container being trapezoidal in shape and presenting a small end a large end, a base inclined upward from the large end to the small end, and a sealed ink bag within the external ink reservoir container, at least a portion of the ink bag being attached to an interior bottom surface of the external ink reservoir container adjacent to the large end;
(c) flexible tubing operably coupled to the internal ink supply container and to the external ink reservoir container to draw liquid ink from the external ink reservoir container to the internal ink supply container due to the sub-atmospheric pressure maintained within the internal ink supply container, freely of moving mechanical ink-transfer components and freely of capillary action, as liquid ink is discharged by the print head from the internal ink supply container, the flexible tubing extending into the internal ink supply container from the top thereof to at least near the bottom thereof;
(d) a regulator switchable between an open position and a closed position and operably coupled to the flexible tubing, the regulator controlling flow of liquid ink from the external ink reservoir container to the internal ink supply container as needed to continuously replenish the first volume of liquid ink stored in the internal ink supply container when the regulator is in the open position, the regulator comprising an in-line stopcock with a pressure wheel constructed to pinch the tubing closed when the stopcock is in a closed position;
(e) wherein:
  (1) the external ink reservoir container and the flexible tubing are sealed together so as not to be readily removable from each other, replacement of the external ink reservoir container consequently causing replacement of at least a portion of the flexible tubing;
  (2) the disposable ink jet cartridge and the flexible tubing are sealed together so as not to be readily removable from each other, replacement of the disposable ink jet cartridge consequently causing replacement of at least a portion of the flexible tubing;
  (3) the operating time during which the reliability pattern of the print head remains above the second predetermined minimum value during use of the ink jet printer corresponds to the operating time needed to exhaust the first and second volumes of liquid in the internal ink supply container and the external ink reservoir container; and
  (4) the tubing extends into the ink bag and attaches to an interior bottom surface of the ink bag.

20. The continuous ink refill system of claim 19, further wherein the flexible tubing comprises a portion at the disposable ink jet cartridge constructed of a material more rigid than that of the remainder of the flexible tubing.

21. The continuous ink refill system of claim 20, wherein the portion at the disposable ink jet cartridge is connected to the remainder of the flexible tubing by a seal.

22. The continuous ink refill system of claim 19, wherein the flexible tubing comprises more than one piece of flexible tubing.

23. The continuous ink refill system of claim 19, wherein the flexible tubing comprises only one piece of flexible tubing.

* * * * *

UNITED STATES PATENT AND TRADEMARK OFFICE
CERTIFICATE OF CORRECTION

PATENT NO. : 5,629,727
DATED : May 13, 1997
INVENTOR(S) : Paul R. Erickson

It is certified that error appears in the above-indentified patent and that said Letters Patent is hereby corrected as shown below:

On the title page: Item [73] Assignee: should read -- LaserMaster Corporation.--

On the front page of the patent, under "References Cited", U.S. Patent No. 4,342,041 reads "Kasugayana et al." but should read --Kasugayama et al.--.

Column 6, lines 48, 49, 52 and 56, "96" should be --196--.

Column 7, line 15, "pattern" should be --platen--.

Column 7, line 33, --action-- should be added after "capillary".

Column 7, line 34, --action-- should be deleted after "element".

Column 8, line 8, "original" should be --originally--.

Column 9, line 20, "dosed" should be --closed--.

Signed and Sealed this

Twenty-eighth Day of April, 1998

Attest:

*Attesting Officer*

BRUCE LEHMAN

*Commissioner of Patents and Trademarks*